(12) United States Patent
Seneci

(10) Patent No.: US 6,790,471 B2
(45) Date of Patent: Sep. 14, 2004

(54) EDULCORATING SOLUBLE COMPOSITION CONTAINING ALIMENTARY FIBERS, ITS PREPARATION AND USE FOR ALIMENTARY PURPOSE

(75) Inventor: Alessandro Seneci, Segrate (IT)

(73) Assignee: Savas Sas di Seneci Alessandro & C., Milan (IT)

( * ) Notice: Subject to any disclaimer, the term of this patent is extended or adjusted under 35 U.S.C. 154(b) by 0 days.

(21) Appl. No.: 09/859,518

(22) Filed: May 18, 2001

(65) Prior Publication Data

US 2002/0054953 A1 May 9, 2002

Related U.S. Application Data

(63) Continuation-in-part of application No. 09/047,503, filed on Mar. 25, 1998, now abandoned.

(30) Foreign Application Priority Data

Mar. 25, 1997 (IT) .......................................... MI97A0681

(51) Int. Cl.⁷ .......................... A23L 1/236; C08B 37/18
(52) U.S. Cl. ....................... 426/548; 426/650; 426/658
(58) Field of Search ................................ 426/548, 650, 426/658; 127/29; 514/55; 536/20

(56) References Cited

U.S. PATENT DOCUMENTS

| | | | |
|---|---|---|---|
| 5,431,929 A | 7/1995 | Yatka et al. | 426/3 |
| 5,436,329 A | 7/1995 | Caboche | 536/103 |
| 5,478,732 A | 12/1995 | Kunz et al. | 435/101 |
| 5,731,025 A | 3/1998 | Mitchell | 426/548 |
| 5,902,624 A | 5/1999 | Vleugels | 426/548 |
| 6,323,189 B1 * | 11/2001 | Hardinge-Lyme | 514/55 |

FOREIGN PATENT DOCUMENTS

| | | | |
|---|---|---|---|
| EP | 0 420 728 | * | 4/1991 |
| EP | 0 498 463 A1 | | 8/1992 |

OTHER PUBLICATIONS

Coussement, P. "Raftilose & Raftiline: A new generation of dietary fibre", *Deutsche Milchwirtschaft* 46(19);1060–62 (abstract only), Jan. 1995.*

* cited by examiner

*Primary Examiner*—Keith Hendricks
(74) *Attorney, Agent, or Firm*—Nixon & Vanderhye

(57) ABSTRACT

An edulcorating soluble composition containing from 50 to 98% by weight of at least a non gelating alimentary fiber such as insulin and from 0.2 to 50% by weight of at least one natural or synthetic sweetener. The composition has an apparent density of from 400 to 600 g/l. The composition may be added to hot or cold drinks/beverages, a convenient way to increase fiber in the diet.

7 Claims, No Drawings

EDULCORATING SOLUBLE COMPOSITION CONTAINING ALIMENTARY FIBERS, ITS PREPARATION AND USE FOR ALIMENTARY PURPOSE

Tis application is a continuation-in-part of application Ser. No. 09/047,503, filed Mar. 25, 1998 now abandoned, the entire content of which is hereby incorporated by reference in this application.

The present invention concerns both an edulcorating soluble composition containing alimentary fibres, combined with natural and/or synthetic sweeteners, and its preparation and alimentary use.

It is known that the industrial preparation of aliments refined more and more the food by impoverishing the same of natural alimentary fibres. This fact increased the appearance of some gastrointestinal and metabolic pathologies which are typical of the modern age.

For this reason, the experts in alimentation have been recommending since some time the daily assumption of vegetables, fruit and wholemeal products which would be able to re-balance the damages caused by the alimentary refining.

However, several people have some difficulties in following these indications, both for wrong eating habits, and for the daily urgent engagements.

On the other hand, the industrial integration of aliments containing alimentary fibres, results hardly realisable because of the scarce solubility and the gelating phenomena which could occur when said fibres are inserted in food and drinks, such for instance in coffee.

Now, it has been surprisingly found that, thanks to the mixture of appropriate alimentary fibres with sweeteners, it is possible to obtain an edulcorating soluble composition containing fibres, which can be used for the softening of the substances to be swallowed and at the same time for integrating food and drinks both warm and cold with fibres, without, however, presenting gelating and/or insolubility phenomena.

The scope of the present invention is therefore an edulcorating soluble composition containing at least an alimentary non gelating soluble fibre, if necessary in mixture with other alimentary fibres chosen among the gelating alimentary fibres soluble, insoluble or partially soluble, and-one or more sweeteners if necessary in mixture among themselves.

The alimentary fibres are non assimilable substances mainly of vegetal origin, deriving either from the stem, or from the leaves or from the seeds of particular plants. The fibres commonly commercialised have a chemical composition constituted for the greatest part by cellulose and therefore by pectin substances, fats and waxes, present in the plant, and by a woody tissue particularly abundant in the fibre of the leaf.

The fibres which can be used in the present invention are those normally used in the dietetic-alimentary field, for example: the non gelating soluble fibres as inulin, fibre of chicory, fibre of acacia and similar, inulin being the preferred one; the soluble gelating fibres as pectin, agar-agar, karaja gum, guar gum, glucomannan, carob, seeds of carob, fibres insoluble or partially soluble as pea, beetroot, apple, oat, wheat, maize, soy, cacao, barley, carob, seeds of carob, hazelnut and fibres in general of vegetables, citrus fruits and cereals (lemon, orange, bean). Also fibres of animal origin, such for instance chitosan, or of synthetic origin, such for instance fructo-oligosaccharides or gluco-olygosaccharides, can be used for the purposes of the present invention.

In the composition of the present invention said fibres are suitably mixed with some sweeteners, that is, substances having a taste more or less sweet; among these, there are substances belonging to chemical classes very different and heterogeneous.

Commonly, the sweeteners are divided into two fundamental groups: natural sweeteners and synthetic sweeteners. The fundamental difference between the sweeteners of the two classes is represented by the fact that while the natural sweeteners constitute an excellent biological fuel and therefore they produce calories, the synthetic sweeteners do not produce calories and, consequently, can be used even where, for pathological reasons or for other reasons, the alimentary use of saccharose (and of polysaccharides which release glucose in the metabolism process) is controindicated and has to be limited.

In the composition of the present invention are used as synthetic sweeteners: acesulfame K, aspartame, cyclamic acid and its sodium and/or calcium salts, saccharin and its salts of sodium, potassium and calcium, thaumathine, neoesperidine DC; as natural sweeteners it is possible to use the polyhidric alcohols, among which there are first of all those related to glucosides, as for example, sorbitol or different glucosides, as saccharose (cane sugar, beet sugar), considered the natural sweetener for excellence, glucose, fructose, invert sugar, dextrose and honey.

In particular, the main object of the present invention is that of providing an edulcorating composition substantially based on a non gelating alimentary fibre, such for instance inulin, which composition is soluble in hot and cold drinks and, in particular, in expresso coffee.

Such a result has been achieved by an edulcorating soluble composition having an apparent density of from 400 to 600 g/l and containing from 50 to 98% by weight of at least a non gelating alimentary fibre and from 0.2 to 50% by weight of at least one sweetener. The expression "apparent density" indicates the ratio (g/l) between the weight of the composition and the apparent volume thereof; the expression "apparent volume" indicates the volume of the composition without compression.

According to the best realization of the invention, the present composition is a powder having an apparent density of from 430 to 550 g/l whereas the non gelating soluble alimentary fibre is inulin. Preferably, from 10 to 13% by weight of the composition has a granulometry of 400–800 $\mu$m, from 30 to 50% by weight of the composition has a granulometry of 200–400 $\mu$m and from 8 to 16% by weight of the composition has a granulometry lower than 100 $\mu$m; even more preferably, from 11 to 12% by weight of the composition has a granulometry of 400–800 $\mu$m, from 35 to 45% by weight of the composition has a granulometry of 200–400 $\mu$m and from 9 to 15% by weight of the composition has a granulometry lower than 100 $\mu$m.

The synthetic sweetener is normally present in amounts of 0.5–5 % of the weight of said non gelating alimentary fibre whereas the natural sweetener is present in amounts of 1–20% of the weight of said non gelating alimentary fibre.

A further object of the present invention is represented by a method for sweetening a cold or hot drink, such as coffeee, expresso coffee or chocolate, said method comprising the addition to the drink of an effective amount of the present composition, preferably from 1 to 10% by weight of the drink itself.

The composition according to the present invention can be obtained from alimentary fibres having the following technical characteristics:

| | |
|---|---|
| particle size distribution: | 80% (by weight) between 20 to 130μ |
| wettability: | 1 second (maximum) |
| dry matter content: | 95% by weight (maximum) |
| ashes content | 0.1% by weight (minimum) |

The fibres can thus be granulated on fluid bed according to the methods known in this art. In particular, the various sweeteners and excipients are dissolved in the water which is then used to wet the fibres in the fluid bed for about 5 minutes and at a temperature preferably not higher than 35° C.; the mixture thus obtained is then dried at a temperature of about 65° C. until a water content lower than 2% by weight is achieved. For a better illustration of the present invention, hereinafter are the examples which are in no way limitative of the same.

EXAMPLE 1

| | |
|---|---|
| Inulin | 56.76% |
| Sodium ciclammate | 8.000% |
| Acesulfame K | 0.320% |
| Neoesperidine | 0.012% |
| Vanilla aroma in powder | 0.280% |
| Sorbitol | 4.028% |
| Acacia fibre | 30.600% |
| Apparent density | 437 (g/l) |
| Granulometry | |
| >800 μm | 0.9% |
| 400–800 μm | 11.2% |
| 200–400 μm | 38.3% |
| 100–200 μm | 37.1% |
| <100 μm | 12.5% |

% = weight percentage

EXAMPLE 2

| | |
|---|---|
| Inulin | 86.35% |
| Sodium ciclammate | 13.00% |
| Acesulfame K | 0.58% |
| Neoesperidine | 0.02% |
| Vanilla aroma in powder | 0.05% |
| Apparent density | 465 (g/l) |
| Granulometry | |
| >800 μm | 0.5% |
| 400–800 μm | 12% |
| 200–400 μm | 43% |
| 100–200 μm | 35% |
| <100 μm | 9.5% |

% = weight percentage.

EXAMPLE 3

| | |
|---|---|
| Inulin | 83.334% |
| Sodium ciclammate | 15.640% |
| Acesulfame K | 0.670% |
| Neoesperidine | 0.026% |
| Vanilla aroma in powder | 0.330% |
| Apparent density | 510 (g/l) |
| Granulometry | |
| >800 μm | 0.7% |
| 400–800 μm | 11.7% |
| 200–400 μm | 35.8% |
| 100–200 μm | 38% |
| <100 μm | 13.8% |

% = weight percentage.

EXAMPLE 4

| | |
|---|---|
| Inulin | 93.35 |
| Fruttose | 3.00 |
| Sodium saccharine | 3.00 |
| Acesulfame K | 0.50 |
| Neoesperidine | 0.05 |
| Vanilla aroma in powder | 0.10 |
| Apparent density | 450 +/− 50 (g/l) |
| Granulometry | |
| >800 μm | 0.7% |
| 400–800 μm | 11.2% |
| 200–400 μm | 39% |
| 100–200 μm | 35% |
| <100 μm | 14.1% |

% = weight percentage.

EXAMPLE 5

| | |
|---|---|
| Inulin | 0.50 g |
| Chitosan | 0.275 g |
| Aspartame | 0.020 g |
| natural flavour of vanilla | 0.005 g |

The compositions disclosed in examples 1 to 5 have been used to sweeten hot expresso coffee, hot and cold coffee and hot chocolate; the compositions have been used in amounts ranging from 1 to 10% by weight of the above mentioned drinks and have perfectly dissolved upon stirring.

What is claimed is:

1. An edulcorating soluble composition in the form of a powder containing from 50 to 98% by weight of inulin and from 0.2 to 50% by weight of at least one sweetener, wherein said at least one sweetener is a synthetic sweetener and wherein said inulin is present in admixture with chitosan.

2. A composition according to claim 1, wherein said composition has an apparent density of from 430 to 550 g/l.

3. A composition according to claim 1, wherein from 10 to 13% by weight of the composition itself has a granulometry of 400–800 μm, from 30 to 50% by weight of the composition itself has a granulometry of 200–400 μm and from 8 to 16% by weight of the composition itself has a granulometry lower than 100 μm.

4. A composition according to claim 3, wherein from 11 to 12% by weight of the composition itself has a granulometry of 400–800 μm, from 35 to 45% by weight of the composition itself has a granulometry of 200–400 μm and from 9 to 15% by weight of the composition itself has a granulometry lower than 100 μm.

5. A composition according to claim 1 wherein said at least one synthetic sweetener is present in an amount of 0.5–5% of the weight of said inulin.

6. A composition according to claim 1, wherein said composition has an apparent density of from 400 to 600 g/l.

7. A composition according to claim 1, wherein said synthetic sweetner is selected from the group consisting of acesulfame K, aspartame, cyclamic acid, the sodium salts of cyclamic acid, the calcium salts of cyclamic acid, saccharine, the sodium salts of saccharine, the potassium salts of saccharine, the calcium salts of saccharine, thaumatine and neoesperidine DC.

* * * * *